(12) United States Patent
Lu et al.

(10) Patent No.: US 10,066,152 B2
(45) Date of Patent: Sep. 4, 2018

(54) CROSSLINKABLE PROPPANT PARTICULATES FOR USE IN SUBTERRANEAN FORMATION OPERATIONS

(71) Applicant: Halliburton Energy Services, Inc., Houston, TX (US)

(72) Inventors: Zheng Lu, Kingwood, TX (US); Humberto Almeida Oliveira, The Woodlands, TX (US); Chandra Sekhar Palla-Venkata, Sugar Land, TX (US); Denise Nicole Benoit, Houston, TX (US); Prashant D. Chopade, Kingwood, TX (US); Philip D. Nguyen, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/312,835

(22) PCT Filed: Aug. 15, 2014

(86) PCT No.: PCT/US2014/051333
§ 371 (c)(1),
(2) Date: Nov. 21, 2016

(87) PCT Pub. No.: WO2016/025002
PCT Pub. Date: Feb. 18, 2016

(65) Prior Publication Data
US 2017/0198208 A1 Jul. 13, 2017

(51) Int. Cl.
*C09K 8/80* (2006.01)
*C08F 230/06* (2006.01)
(Continued)

(52) U.S. Cl.
CPC .............. *C09K 8/80* (2013.01); *C08F 230/06* (2013.01); *C09K 8/56* (2013.01); *C09K 8/685* (2013.01);
(Continued)

(58) Field of Classification Search
CPC ......... E21B 43/26; E21B 43/267; C09K 8/80; C09K 8/56; C09K 8/68; C09K 8/685; C09K 8/72; C08F 230/06
See application file for complete search history.

(56) References Cited

U.S. PATENT DOCUMENTS 5,271,466 A * 12/1993 Harms ................... C09K 8/685
166/300
6,311,773 B1 11/2001 Todd et al.
(Continued)

FOREIGN PATENT DOCUMENTS

CA 2532303 A1 7/2006
WO 2013158308 A1 10/2013
(Continued)

OTHER PUBLICATIONS

International Search Report and Written Opinion for PCT/US2014/051333 dated Jun. 5, 2015.
(Continued)

*Primary Examiner* — Zakiya W Bates
*Assistant Examiner* — Crystal J Miller
(74) *Attorney, Agent, or Firm* — McDermott Will & Emery LLP

(57) ABSTRACT

Methods including preparing a treatment fluid comprising an aqueous base fluid, a gelling agent, and crosslinkable proppant particulates comprising proppant particulates having covalently grafted thereon a boronic acid functional group; crosslinking the crosslinkable proppant particulates with the gelling agent, thereby suspending the crosslinkable proppant
(Continued)

particulates in the treatment fluid; introducing the treatment fluid into a subterranean formation having at least one fracture therein; and placing the crosslinkable proppant particulates into the at least one fracture to form a proppant pack therein.

20 Claims, 1 Drawing Sheet

(51) Int. Cl.
*E21B 43/267* (2006.01)
*C09K 8/68* (2006.01)
*C09K 8/72* (2006.01)
*C09K 8/56* (2006.01)

(52) U.S. Cl.
CPC .............. *C09K 8/72* (2013.01); *E21B 43/267* (2013.01); *C09K 2208/24* (2013.01); *C09K 2208/26* (2013.01)

(56) References Cited

U.S. PATENT DOCUMENTS

| | | | | |
|---|---|---|---|---|
| 7,000,702 | B2* | 2/2006 | Hanes, Jr. ................ | C09K 8/68 166/308.5 |
| 7,013,974 | B2* | 3/2006 | Hanes, Jr. ............... | C09K 8/685 166/279 |
| 7,687,441 | B2 | 3/2010 | Hanes, Jr. et al. | |
| 8,227,026 | B2* | 7/2012 | McDaniel ............... | C09K 8/805 427/212 |
| 8,371,383 | B2* | 2/2013 | Bell ........................ | C09K 8/685 166/300 |
| 8,424,603 | B2* | 4/2013 | Loveless ................. | C09K 8/12 166/278 |
| 8,708,045 | B2* | 4/2014 | Ogle ........................ | C09K 8/12 166/300 |
| 9,194,223 | B2* | 11/2015 | Bell ........................ | E21B 43/267 |
| 9,410,415 | B2* | 8/2016 | Bell ........................ | E21B 43/267 |
| 9,534,167 | B2* | 1/2017 | Legemah ................ | C07F 5/025 |
| 2006/0089265 | A1 | 4/2006 | Hanes et al. | |
| 2009/0238988 | A1* | 9/2009 | McDaniel ............... | C09K 8/805 427/487 |
| 2011/0146996 | A1* | 6/2011 | Bell ........................ | C09K 8/685 166/308.5 |
| 2012/0000659 | A1* | 1/2012 | Loveless ................. | C09K 8/12 166/305.1 |
| 2012/0004148 | A1* | 1/2012 | Ogle ........................ | C09K 8/12 507/213 |
| 2013/0153233 | A1* | 6/2013 | Bell ........................ | E21B 43/267 166/308.1 |
| 2013/0220621 | A1* | 8/2013 | Legemah ................ | C07F 5/025 166/308.5 |
| 2013/0233545 | A1 | 9/2013 | Mahoney et al. | |
| 2013/0274153 | A1 | 10/2013 | Urbanek | |
| 2014/0057812 | A1* | 2/2014 | Ogle ........................ | C09K 8/80 507/204 |
| 2014/0060832 | A1 | 3/2014 | Mahoney et al. | |
| 2014/0087974 | A1 | 3/2014 | Villarreal et al. | |
| 2014/0262296 | A1* | 9/2014 | Dobson, Jr. ............ | C09K 8/685 166/308.5 |
| 2015/0075789 | A1* | 3/2015 | Singh ...................... | C09K 8/685 166/278 |
| 2016/0069175 | A1* | 3/2016 | Bell ........................ | E21B 43/267 166/308.5 |
| 2016/0319186 | A1* | 11/2016 | Chopade ................. | C09K 8/508 |
| 2016/0340575 | A1* | 11/2016 | Nguyen .................. | C09K 8/685 |

FOREIGN PATENT DOCUMENTS

| | | |
|---|---|---|
| WO | 2015147775 A1 | 10/2015 |
| WO | 2016025002 A1 | 2/2016 |
| WO | 2016025005 A1 | 2/2016 |

OTHER PUBLICATIONS

Dafinov et al., "Modification of ceramic membranes by alcohol adsorption," J. of Membrane Science, vol. 196(1), pp. 69-77 (Feb. 2002).

Pelton et al., Facile Phemylboronate Modification of Silica by a Silaneboronate, Langmuir 2013, 29, 594-598.

SPE 73755, Asadi et al., "Zero Shear Viscosity Determination of Fracturing Fluids . . . ," 2002.

SPE 95287, Harris et al., "Measurement of Proppant Transport of Frac Fluids," 2005.

Canadian Office Action from Canadian Patent Application No. 2,954,266, dated Jan. 5, 2018, 4 pages.

Australian Examination Report from Australian Patent Application No. 2014403362, dated Apr. 19, 2017, 5 pages.

* cited by examiner

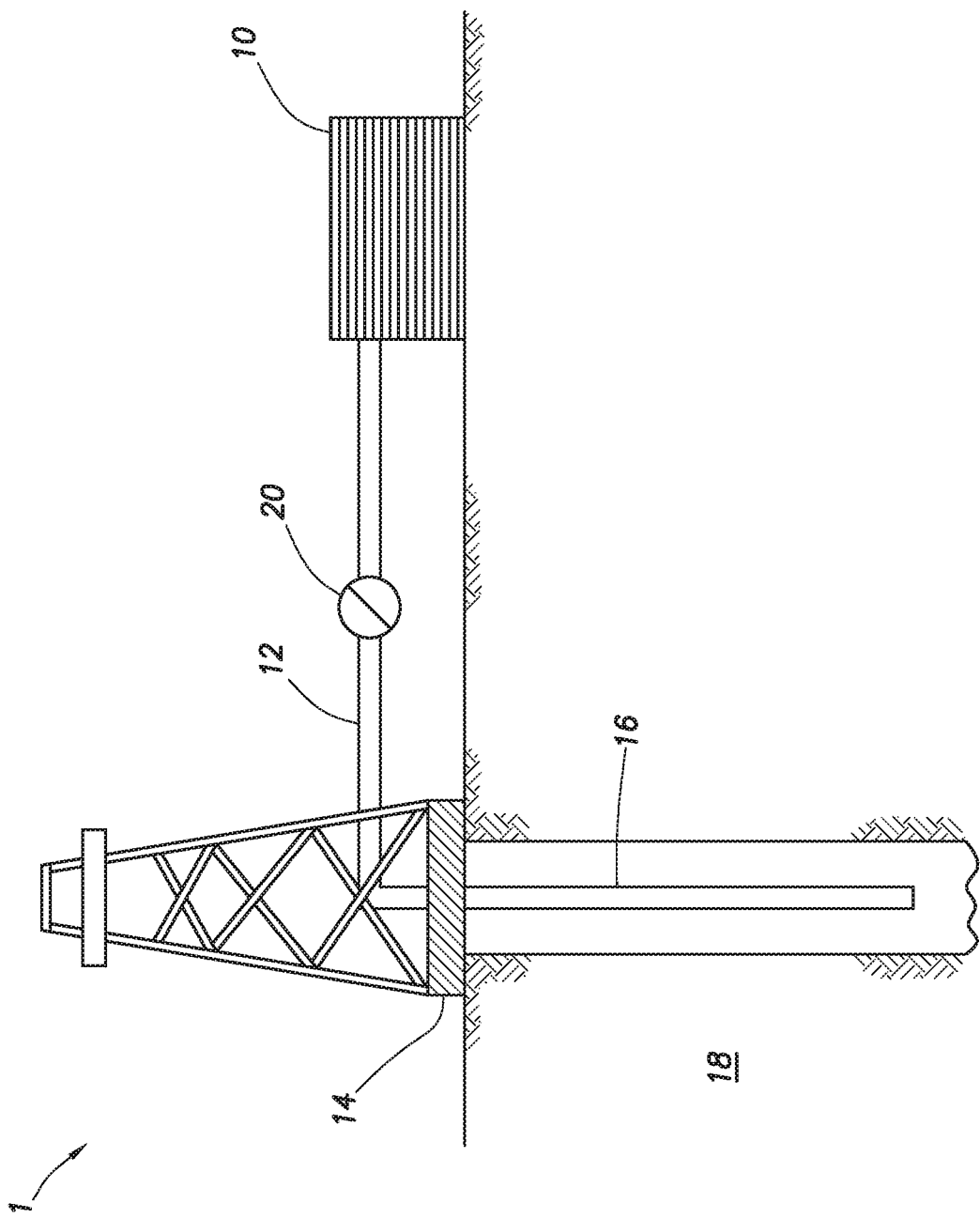

CROSSLINKABLE PROPPANT PARTICULATES FOR USE IN SUBTERRANEAN FORMATION OPERATIONS

BACKGROUND

The embodiments herein relate generally to subterranean formation operations and, more particularly, to crosslinkable proppant particulates.

Subterranean wells (e.g., hydrocarbon producing wells, water producing wells, and the like) are often stimulated by hydraulic fracturing treatments. In hydraulic fracturing treatments, a gelled treatment fluid is often pumped into a portion of a subterranean formation at a rate and pressure such that the subterranean formation breaks down and one or more fractures are formed therein. Particulate solids, such as graded sand, are typically suspended in at least a portion of the treatment fluid and deposited into the fractures in the subterranean formation. These particulate solids, or "proppants particulates" (also referred to simply as "proppants") serve to prop the fracture open (e.g., keep the fracture from fully closing) after the hydraulic pressure is removed. By keeping the fracture from fully closing, the particulates aid in forming conductive paths through which produced fluids, such as hydrocarbons, may flow.

Hydraulic fracturing treatments may also be combined with sand control treatments, such as a gravel packing treatment. Such treatments may be referred to as "frac-packing" treatments. In a typical frac-packing treatment, a gelled treatment fluid comprising a plurality of particulates (e.g. is pumped through the annulus between a wellbore tubular mounted with a screen and a wellbore in a subterranean formation. The fluid is pumped into perforations through a casing, or directly into the wellbore in the case of open hole completions at a rate and pressure sufficient to create or enhance at least one fracture, and the particulates are deposited in the fracture and in the annulus between the screen and the wellbore. The particulates aid in propping open the fracture, as well as controlling the migration of formation fines or other loose particles in the formation from being produced with produced fluids.

The degree of success of a fracturing operation (both a traditional hydraulic fracturing operation and a frac-packing operation) depends, at least in part, upon fracture porosity and conductivity once the fracturing operation is complete and production is begun. Fracturing operations may place a volume of particulates into a fracture to form a "proppant pack" or "gravel pack" (referred to herein as "proppant pack") in order to ensure that the fracture does not close completely upon removing the hydraulic pressure. In some fracturing operations, a large volume of particulates may be placed within the fracture to form a tight proppant pack. In other fracturing operations, a much reduced volume of particulates may be placed in the fracture to create larger interstitial spaces between the individual particulates. However, both fracturing approaches may result in at least some settling of the particulates within a treatment fluid as the treatment fluid is introduced downhole or after placement in a fracture opening.

Particulate settling may lead to a fracture or a top portion (wherein top refers to the opposite direction of gravity) of a fracture closing, which may lower the conductivity of the proppant fracture and result in proppant masses having little or no interstitial spaces at the bottom portion of a fracture, thereby further decreasing the conductivity of the fracture. Proppant settling may be particularly problematic in cases where larger or heavier are used in place of traditional proppant particulates which may be more difficult to hold in suspension. While settling may be counteracted by using a high pump rate or by increasing the viscosity of the fluid carrying the proppant particulates, such methods often lose effectiveness once the fluid comprising the proppant is placed into a fracture and before the hydraulic pressure is released.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the treatment fluids comprising the crosslinkable proppant particulates of the embodiments described herein to a downhole location.

DETAILED DESCRIPTION

The embodiments herein relate generally to subterranean formation operations and, more particularly, to crosslinkable proppant particulates. The crosslinkable proppant particulates of the embodiments described herein comprise a functional group and may be used with or without a crosslinker. The crosslinkable proppant particulates described herein may have some or all of the following benefits: they may be used without coating the proppant with a resin or tackifying agent; they may minimize or eliminate the use of crosslinkers in a treatment fluid; they may minimize the amount of gelling agent needed in the treatment fluid, which also reduces negative effects of gelling agents on final proppant pack conductivity; they may minimize the importance of proppant size and density; and they may generally decrease costs associated with performing fracturing operations. The crosslinkable proppant particulates described herein exhibit a strong interaction with a gelling agent and/or crosslinker in a treatment fluid, thereby allowing the crosslinkable proppant particulates to self-suspend in the treatment fluid for delivery to a downhole location. Specifically, the crosslinkable proppant particulates become chemically bonded to a gelling agent and/or crosslinkers in the treatment fluid, essentially becoming part of the gelled or gelled and crosslinked structure of the fluid rather than simply being suspended therein thereby also aiding the transport of the proppant particulates to the far tip of a fracture.

In some embodiments, the methods and compositions described herein may be with reference to a hydraulic fracturing operation (e.g., formation of a proppant pack). However, the crosslinkable proppant particulates may be used in any other subterranean formation operation that may employ a treatment fluid comprising a gelling agent and that may benefit from having a suspended particulate. Such subterranean formation operations may include, but are not limited to, a stimulation operation; an acidizing operation; an acid-fracturing operation; a sand control operation; a fracturing operation; a frac-packing operation; a remedial operation; a near-wellbore consolidation operation; and any combination thereof.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides crosslinkable proppant particulates comprising proppant particulates having covalently grafted thereon a boronic acid functional group. By way of example, the boronic acid functional group may be covalently bonded to the proppant through a condensation reaction with hydroxyl groups on the proppant particulates. The crosslinkable proppant particulates may be included in a treatment fluid comprising an aqueous base fluid and a gelling agent, where the crosslinkable proppant particulates crosslink with the gelling agent to suspend the crosslinkable proppant particulates in the treatment fluid. That is, the boronic acid functional group chemically bonds with the gelling agent (e.g., covalent bonds); accordingly, in some embodiments no additional crosslinker is required in the treatment fluid other than that present on the crosslinkable proppant particulates, although such crosslinkers may be included in the treatment fluids described herein without departing from the scope of the present disclosure. The treatment fluid may then be introduced into a subterranean formation having at least one fracture therein and the crosslinkable proppant particulates placed into the at least one fracture to form a proppant pack therein. In some embodiments, the treatment fluid comprising the crosslinkable proppant particulates may be introduced into the subterranean formation at a rate and pressure sufficient to create or enhance the at least one fracture or the fracture may be formed prior to introducing the treatment fluid into the subterranean formation, such as by use of a pad fluid or other method (e.g., shaped charges or hydrojetting).

The boronic acid functional group (e.g., $B(OH)_2$) for use in forming the crosslinkable proppant particulates of some embodiments described herein may be any boronic acid functional group or compound capable of providing a boronic acid functional group that is capable of chemically bonding with the gelling agent in the treatment fluid to suspend the crosslinkable proppant particulates. In some embodiments, the boronic acid functional group may be an alkyl boronic acid group, and alkenyl boronic acid group, an aryl boronic acid group (e.g., vinyl aryl boronic acid group), a heteroaryl boronic acid group, any compound providing any of the foregoing groups, and any combination thereof.

In other embodiments, the boronic acid functional group is a multifunctional copolymer comprising at least one boronic acid monomer unit and at least one water-soluble monomer unit. In some embodiments, the multifunctional boronic acid polymer may comprise a random copolymer of at least one boronic acid monomer unit and at least one water-soluble monomer unit, particularly a random copolymer in which the boronic acid monomer units are distributed over substantially all of the polymer chain length. In alternative embodiments, the multifunctional boronic acid polymer may comprise a gradient copolymer. As used herein, the term "gradient copolymer" will refer to a copolymer in which there is a block or random distribution of at least two monomer units in the copolymer, wherein at least one of the monomer units is not substantially distributed over the whole length of the polymer chain. In other embodiments, the multifunctional boronic acid polymer is not a gradient copolymer.

In general, any boronic acid or boronate ester derived therefrom may be suitable for use in the multifunctional boronic acid polymers for forming the crosslinkable proppant particulates described herein. In some embodiments, the boronic acid monomer units may be aryl boronic acids, particularly vinyl aryl boronic acids. An illustrative aryl boronic acid that may be 4-vinylphenylboronic acid or its positional isomers, for example. Other substituted aryl boronic acids containing a polymerizable functional group (e.g., an alkene) and optional functionality on the aryl ring (e.g., alkyl groups, halogens, carbonyl groups, amines, hydroxyl groups, carboxylic acids and their derivatives, and the like) may also be used, if desired. In other embodiments, the boronic acids containing a polymerizable functional group may be alkyl, alkenyl, or alkynyl boronic acids (i.e., aliphatic boronic acids) in which the alkyl, alkenyl, or alkynyl groups may contain optional substitution, if desired.

In some embodiments, the multifunctional boronic acid polymers may be star shaped or dendrimeric in nature. The multifunctional boronic acid polymers may also be polymeric in nature. In some embodiments, a polymeric multifunctional boronic acid polymer may be a block copolymer including, but not limited to, a diblock, triblock or multi-block copolymer. A polymeric multifunctional boronic acid polymer may also be a copolymer of various monomers and may also be in the form of comb or brush shaped polymer. In some embodiments, the multifunctional boronic acid polymers of the present disclosure may be water-soluble. As used herein, the term "water-soluble" refers to substantial (i.e., largely but not necessarily wholly) solubility in water at room temperature (about 22° C. (72° F.)).

In some embodiments, the multifunctional boronic acid polymers may be star shaped or dendrimeric in nature. An exemplary structure of a dendrimeric multifunctional boronic acid polymer is shown in Formula I, where R is an organic group.

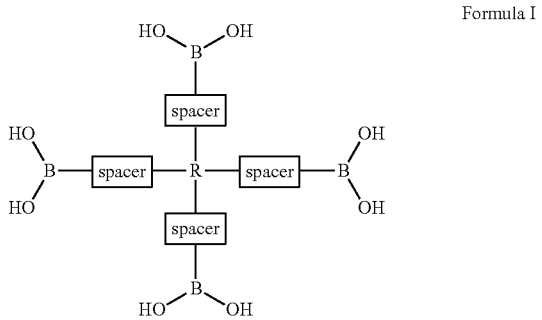

Formula I

As used herein, the terms "dendritic polymers" or "dendrimers" refer to polymers which are distinguished by a branched structure. Dendrimers (e.g., cascade polymers, arborols, isotropically branched polymers, isobranched polymers, starburst polymers) generally are macromolecules which are uniform at the molecular level and have a highly symmetrical structure. Dendrimers are derived structurally from the star polymers, the individual chains in turn each being branched in a star-like manner. They may form from small molecules by a constantly repeating reaction sequence, resulting in one or more branches, on the ends of which there are in each case functional groups which in turn are starting points for further branching. Thus, the number of functional terminal groups multiplies with each reaction step. A characteristic feature of the dendrimers is the number of reaction steps (generations) carried out for their synthesis. Owing to their uniform structure, dendrimers may have as a rule a defined molar mass. In some embodiments, the multifunctional boronic acid polymers for use in forming the crosslinkable proppant particulates of the present disclosure may be dendrimeric in nature with a lower limit of about 2, 3, 4, 5, and 6 to an upper limit of about 10, 9, 8, 7, and 6 generations, encompassing any value and subset therebetween. In another embodiment, the dendrimeric multifunctional boronic acid polymers may have about 2 to about 5 generations. In some embodiments, the dendrimeric multifunctional boronic acid polymers may generally have a molecular weight between a lower limit of about 1,000, 1,500, 2,000, 2,500, 3,000, 3,500, 4,000, 4,500, 5,000, and 5,500 Daltons and about 10,000, 9,500, 9,000, 8,500, 8,000, 7,500, 7,000, 6,500, 6,000, and 5,000 Daltons, encompassing any value and subset therebetween.

As used herein, the term "star polymers" refer to polymers in which three or more chains extend from a center moiety. The center moiety may be a single atom or a group of atoms. Star polymers may be produced either by polymerization from multifunctional cores or by post modification reactions. Polymerization from a multifunctional core may be desirable for high molecular weight polymers.

The dendritic or star polymeric multifunctional boronic acid polymers for use in forming the crosslinkable proppant particulates described herein may comprise any suitable monomer units and/or spacer units (e.g., "R" or "spacer" in Formula I) that result in a water-soluble molecule in addition to one or more boronic acid functional groups. In some embodiments, the monomer units may be water-soluble. For example, Formula I illustrates a dendritic multifunctional boronic acid polymer with at least one generation that may have up to four boronic acid functional groups. In some embodiments with at least 2 generations, the dendritic multifunctional boronic acid polymers may have up to eight boronic acid functional groups in the outer generation. In addition to the boronic acid functional group, spacer units may comprise a polymer or oligomer synthesized from at least one water-soluble monomer unit that include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid, alkyl acrylates, alkyl methacrylates, alkyl acrylamides, alkyl methacrylamides, alkyl dimethylammoniumethyl methacrylate halides, alkyl dimethylammoniumpropyl methacrylamide halides, any derivative thereof, or any combination thereof. Suitable spacer units may also comprise any suitable linkage moieties, including, but not limited to, an amide, ester, ether, phosphate esters, amides, acetals, ketals, orthoesters, carbonates, anhydrides, silyl ethers, alkene oxides, ethers, imines, ether esters, ester amides, ester urethanes, carbonate urethanes, and amino acids linkage and derivatives or any combination thereof. Suitable spacer units may also comprise any suitable linkage moieties, including but not limited, to an alkane, a polyethylene amine, a polyethylene oxide, a polyester, polycarbonate, polyurethane, polyphosphate esters, polyamides, polyacetals, polyketals, polyorthoesters, polyanhydrides, polysilyl ethers, poly(alkene oxides), polyethers, polyimines, poly(ether esters), poly(ester amides), poly(ester urethanes), poly(carbonate urethanes), and poly(amino acids), and any derivative thereof or any combination thereof. In addition to these water-soluble monomer units and/or spacer units, one or more hydrophobic and/or hydrophilic monomer units or polymers comprising hydrophobic monomers may also be present in the interior generations of the dendrimer so long as any hydrophobic monomer units do not interfere with the water solubility of the molecule. In some embodiments, the multifunctional boronic acid polymers may have a ratio of boronic acid functional groups to monomers on the outer generation ranging from about 1:1 to about 1:200.

In some embodiments, the multifunctional boronic acid polymers may be a difunctionalized molecule. A suitable difunctionalized molecule structure may include, but is not limited to, the structure generally represented by Formula II, where $R_1$ is an organic group.

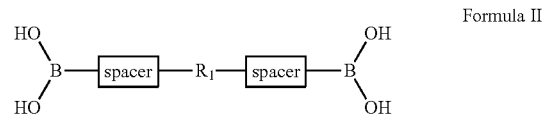

Formula II

In Formula II, $R_1$ and/or the spacer(s), alone or in combination, may be a functional group, a monomer, and/or a polymer with an average molecular weight in the range of about 200 Daltons to about 2,000,000 Daltons. The spacer(s) may be a small oligomer, a functional group, or a polymer suitable for connecting the monomer or polymer $R_1$ to the boronic acid functional group. Suitable spacer units may comprise any suitable moieties, including, but not limited to, an amide group, an ester group, or an ether group. Suitable polymers useful as spacer units may include, but are not limited to, polyalphaolefins, polyaryletherketones, polybutenes, polyimines, polycarbonates, polyesters, aromatic polyamides, ethylene vinyl acetate polymers, polyacetals, polyethylenes, polyethylene oxides, polypropylenes, polymethylpentene, polyphenylene oxide, polystyrene, any derivative thereof, or any combination thereof. In some embodiments, the multifunctional boronic acid polymers of the general structure shown in Formula II may be a water-soluble polymer and may comprise any number of suitable monomer units that do not interfere with the crosslinking of the boronic acid functional groups with the gelling agent in the treatment fluids described herein.

The multifunctional boronic acid polymers may include, but are not limited to, the structure generally represented by Formula III, where X represents a functionality bound to a monomer unit of the polymer backbone. Although Formula III has indicated a regular spacing between boronic acid monomer units, it is to be recognized that the spacing of boronic acid monomer units may be regular in some embodiments or random in other embodiments.

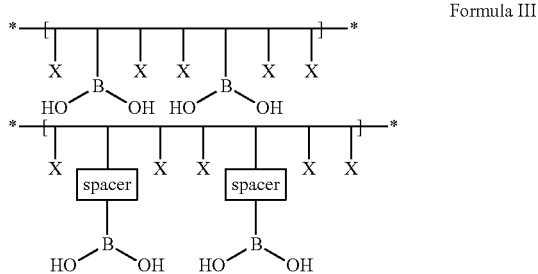

Formula III

In some embodiments, the multifunctional boronic acid polymer comprises at least one boronic acid monomer unit and at least one water-soluble monomer unit, and may be a random copolymer or a gradient copolymer, for example. Formula IV shows a structure of an illustrative but non-limiting gradient copolymer containing monomer units A and B. According to the present embodiments, a multifunctional boronic acid polymers synthesized according to conventional techniques would have a structure related to that of Formula IV, where A represents a monomer unit comprising a boronic acid functionality. The formation of a gradient copolymer such as that shown in Formula IV may result from a faster reaction rate of one monomer compared to the other. In the case of Formula IV, monomer unit A (the boronic acid) has a much faster reaction rate than monomer B, such that the interior portion of the polymer chain is dominated by monomer A and the termini of the polymer chain is dominated by monomer B.

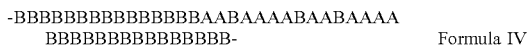

Formula IV

In some embodiments, the multifunctional boronic acid polymers may not be a gradient copolymer. An illustrative but non-limiting non-gradient copolymer may have a structure shown in Formula V below, where A presents a monomer unit comprising a boronic acid functionality. A multifunctional boronic acid polymer for use in forming the crosslinkable proppant particulates of the present disclosure may have only about 5 B monomer units on its chain termini, as compared to 15 B monomer units in Formula IV.

Formula V

In some embodiments, the multifunctional boronic acid polymers may comprise at least one water-soluble monomer unit. Suitable water-soluble monomer units may include, for example, an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof.

In various embodiments, the multifunctional boronic acid polymers may comprise at least one boronic acid monomer unit, particularly a boronic acid monomer unit containing a polymerizable vinyl, allyl, or acrylic functional group. In some embodiments, the at least one boronic acid monomer unit may comprise an aryl boronic acid. In other embodiments, the at least one boronic acid monomer unit may comprise an alkyl, alkenyl or alkynyl boronic acid (i.e., aliphatic boronic acids). It should be noted that the classification of a boronic acid as aryl, alkyl, alkenyl or alkynyl refers to the point of attachment of the boronic acid group. That is, for example, an aryl boronic acid has a boronic acid or a boronate ester derivative thereof attached to an aryl ring, and an alkenyl boronic acid has a boronic acid or boronate ester derivative thereof attached to an alkenyl group. A boronic acid may have additional functionality elsewhere in the molecule. For example, an aryl boronic acid may have an alkenyl functionality elsewhere in the molecule that is not attached to the boronic acid functionality.

The multifunctional boronic acid polymers maybe synthesized by combining at least one water-soluble monomer unit and at least one boronic acid monomer unit and allowing polymerization to occur, for example, by free radical polymerization. This type of synthesis may lead to gradient copolymer formation. Typically, the synthesis of multifunctional boronic acid polymers may be carried out by emulsion polymerization, although solution polymerization may also be used. Most often, an elevated pH may be needed to fully dissolve a boronic acid monomer unit (e.g., pH>~11). Lower pH values may also be used for some boronic acids, particularly if electron withdrawing groups are present to stabilize the boronate conjugate base. At elevated pH values, conventional free radical-induced chain polymerizations may not run effectively, and oftentimes highly reactive hydroxyl radicals may be formed. In addition, under such conditions, boronic acid monomer units may react more rapidly than do other monomer units, thereby facilitating gradient copolymer formation.

Techniques may also be used to reduce the gradient character of the multifunctional boronic acid polymers described herein by using living radical polymerization reactions. Illustrative living radical polymerization techniques that may be suitable for producing a multifunctional boronic acid polymers described herein may include, for example, catalytic chain transfer, including cobalt-mediated radical polymerization, iniferter polymerization, stable free radical mediated polymerization, atom transfer radical polymerization, reversible addition fragmentation chain transfer polymerization, iodine-transfer polymerization, selenium-centered radical-mediated polymerization, tellurium-mediated polymerization, and stibine-mediated polymerization. Any other living radical polymerization technique that may be envisioned by one having ordinary skill in the art may also be compatible with the present embodiments without departing from the scope disclosed herein.

In some embodiments, the multifunctional boronic acid polymers for use in forming the crosslinkable proppant particulates of the present disclosure may employ a solubilizing agent during polymerization of the boronic acid monomer units, which may also protect at least a portion of the boronic acid functionalities as a boronate ester. By including a solubilizing agent and/or protecting boronic acid functionalities with the solubilizing agent before or during a polymerization reaction, a boronic acid monomer unit may be made soluble at a lower pH (e.g., ~9), which may lead to its more effective polymerization. In addition, by further lowering the pH after polymerization occurs, at least a portion of any boronate esters present may be cleaved to the parent boronic acid moieties, such that they are available for crosslinking in a treatment fluid with the gelling agent therein.

In various embodiments, the treatment fluids of the present disclosure including functionalized boronic acid proppant particulates may comprise a solubilizing agent that comprises at least two hydroxyl groups. In some embodiments, at least a portion of the boronic acid monomer units in a multifunctional boronic acid polymer may be functionalized with the solubilizing agent to form a boronate ester. Without being bound by theory or mechanism, it is believed that a solubilizing agent having at least two hydroxyl groups disposed such that they can form a 5- or 6-membered ring boronate ester with a boronic acid monomer unit may be particularly effective. Although any compound may be used that can form a 5- or 6-membered ring boronate ester, it is generally preferred that the compound contain functionality that further facilitates the water solubility of the multifunctional boronic acid polymer. Generally, functionalities that can facilitate water solubility can include, for example, hydroxyl groups, amines and/or carboxylic acid groups. In some embodiments, suitable solubilizing agents may include, but are not limited to, short chain polyols (e.g., glycerol, erythritol, pentaerythritol, and the like), a polysaccharide (e.g., sucrose, glucose, fructose, sorbitol, and the like), amino sugars, sugar alcohols, sugar acids, polyvinyl alcohol, tartaric acid, a catechol, a glycol (e.g., ethylene glycol, propylene glycol, and the like), any derivative thereof, and any combination thereof. In addition to the possible formation of a boronate ester, the solubilizing agent can also promote solubility by acting as a co-solvent and/or lowering the interfacial tension between water and the boronic acid monomer units. That is, in some embodiments, more than a stoichiometric amount of solubilizing agent may be used relative to the boronic acid monomer units.

In some embodiments, the multifunctional boronic acid polymers may comprise a reaction product of at least one boronic acid monomer unit, at least one water-soluble monomer unit, and a solubilizing agent. In some embodiments, the solubilizing agent may be selected from a short chain polyol, a polysaccharide, an amino sugar, a sugar alcohol, a sugar acid, polyvinyl alcohol, tartaric acid, a catechol, a glycol, any derivative thereof, or any combination thereof, for example. In some embodiments, the boronic acid monomer unit may be functionalized with the solubilizing agent (e.g., as a boronate ester) prior to being reacted with the water-soluble monomer unit. An advantage of this approach may be that the boronate ester becomes more soluble, particularly at lower pH values, than is the parent boronic acid monomer unit. In other embodiments, the boronic acid monomer unit may be reacted in situ with the solubilizing agent in a combined reaction mixture containing the boronic acid monomer unit, the water-soluble monomer unit and the solubilizing agent. An advantage of this approach may be that a separate step of functionalizing the boronic acid is not needed.

In some embodiments, the solubilizing agent may be removed from the multifunctional boronic acid polymer before it is placed in a treatment fluid. That is, in such embodiments, the solubilizing agent can simply facilitate the synthesis of the multifunctional boronic acid polymer.

In some embodiments, a multifunctional boronic acid polymer having at least a portion of its boronic acid monomer units functionalized as boronate esters may be included in a treatment fluid. For example, a multifunctional boronic acid polymer can have at least a portion of its boronic acid monomer units functionalized as boronate esters of the previously described solubilizing agents. In some embodiments, the treatment fluid can have its pH adjusted such that at least a portion of the boronate esters are hydrolyzed in situ in the treatment fluid either prior to or after being introduced into a subterranean formation. For example, the pH may be reduced to about 6 or below in some embodiments or to about 7 or below in other embodiments to hydrolyze the boronate esters. In some embodiments, the pH or temperature of the subterranean formation can initiate the hydrolysis of the boronate esters. After hydrolysis of at least a portion of the boronate esters, the multifunctional boronic acid polymer may be operable for crosslinking with the gelling agent in the treatment fluid to self-suspend the crosslinkable proppant particulates. The rate of hydrolysis of a boronate ester will be dependent upon a number of factors including, for example, the pH conditions, the temperature, and the steric and electronic properties of the solubilizing agent and the boronic acid monomer unit.

In some embodiments, the multifunctional boronic acid polymer may comprise a reaction product of at least one boronic acid monomer unit and at least one water-soluble monomer unit, where the at least one boronic acid monomer unit is added continually (e.g., by dropwise or continuous infusion) or portionwise to a polymerization reaction mixture comprising the at least one water-soluble monomer unit. In some embodiments, addition of the at least one boronic acid monomer unit to the reaction mixture may be started, and the polymerization reaction may then be initiated (e.g., by adding an initiator). In other embodiments, the polymerization reaction may be initiated with only the water-soluble monomer unit in the reaction mixture, and addition of the at least one boronic acid monomer unit may then be started. In still other embodiments, initiation of the polymerization reaction and addition of the at least one boronic acid monomer unit may be started at the same time. In some embodiments, the at least one boronic acid monomer unit and an initiator may be added concurrently to a reaction mixture comprising the at least one water-soluble monomer unit.

An advantage of continuous or portionwise addition of the at least one boronic acid monomer unit may be that the faster-reacting boronic acid monomer unit is only present in small concentrations throughout the course of the polymerization reaction. Accordingly, as it reacts with the slower-reacting water-soluble monomer unit, the boronic acid monomer unit may be distributed more thoroughly throughout the length of the polymer chain. Additionally, since the concentration of the boronic acid monomer unit is purposefully kept low during continuous or portionwise addition, a lower pH value can sometimes be used to affect its solubility, as the lower concentration of the boronic acid monomer unit may be below its solubility limit. As previously noted, a lower pH value may be advantageous for inverting an emulsion containing the multifunctional boronic acid polymer. A further advantage of this approach is that removal of a solubilizing group is not a concern in order to expose the free boronic acid functionality.

In some embodiments, the multifunctional boronic acid polymer may be a block copolymer including, but not limited to, a diblock, triblock, or multiblock copolymer. An exemplary embodiment of a suitable diblock copolymer structure may include, but is not limited to, the structure generally represented by Formula VI, where m and n are integers and X represents a functionality bound to a monomer unit of the polymer backbone.

Formula VI

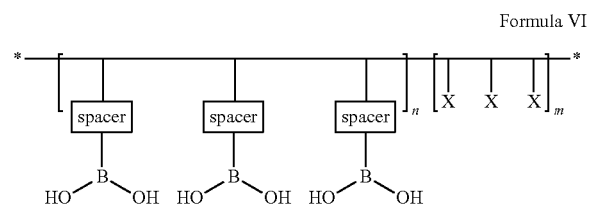

In various embodiments, the copolymers and block copolymers of Formulas III through VI can have an average molecular weight between about 1,000, 100,000, 200,000, 300,000, 400,000, 500,000, 600,000, 700,000, 800,000, 900,000, and 1,000,000 Daltons and about 2,000,000, 1,900,000, 1,800,000, 1,700,000, 1,600,000, 1,500,000, 1,400,000, 1,300,000, 1,200,000, 1,100,000, and 1,000,000 Daltons, encompassing any value and subset therebetween. For the multifunctional boronic acid polymers having the general structures shown in Formulas III through VI, the monomers within the polymer structure may be any suitable monomers that result in a water-soluble polymer molecule and do not interfere with the crosslinking of the boronic acid functional group with a gelling agent in the treatment fluid. Formulas III and VI illustrate that a boronic acid functional group may be directly bonded to the backbone of the polymer and/or the boronic acid functional group may be connected to the polymer backbone with an intervening spacer group.

In some embodiments, the multifunctional boronic acid polymers of the general structure shown in Formula III may be synthesized by polymerization of a vinyl monomer containing a boronic acid functional group (e.g., 3-acrylamidophenyl boronic acid) and any suitable water-soluble monomer unit containing a vinyl group including, but not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid, alkyl acrylates, alkyl methacrylates, alkyl acrylamides, alkyl methacrylamides, alkyl dimethylammoniumethyl methacrylate halides, and alkyl dimethylammoniumpropyl methacrylamide halides. Other functional groups may also be present along the polymer backbone. In some embodiments, the boronic acid functional group may be grafted onto an already formed polymer backbone. In some embodiments, as generally represented by Formulas III and VI, the ratio of the boronic acid monomer units to the other monomer units in the polymer can range from about 1:1, 1:10, 1:20, 1:30, 1:40, 1:50, 1:60, 1:70, 1:80, 1:90, and 1:100 to an upper limit of about 1:200, 1:190, 1:180, 1:170, 1:160, 1:150, 1:140, 1:130, 1:120, 1:110, and 1:100, encompassing any value and subset therebetween.

In some embodiments, the multifunctional boronic acid polymers of the present disclosure may comprise an equilibrium species. For example, the multifunctional boronic acid polymers may become protonated or deprotonated depending on pH. This feature can influence their solubility in a treatment fluid. Likewise, intramolecular interactions between atoms in the multifunctional boronic acid polymers of the present disclosure and the geometry of boron (e.g., tetrahedral or trigonal planar) can depend on pH and/or solvent (e.g., an alcohol-based solvent such as methanol). Thus, the exact chemical composition and geometry of the multifunctional boronic acid polymers of the present disclosure may depend on a particular equilibrium. The geometry can also depend on the neighboring group participation in changing the steoreochemistry. For example, a nitrogen atom present in a neighboring group can share its lone pair of electrons with a boron to result in a tetrahedral geometry, which may allow for the formation of a bond to hydroxyl groups at a relatively neutral pH.

In some embodiments, a multifunctional boronic acid polymer may be prepared by incorporation of one or more of the monomer units listed above in the polymer synthesis with a boronic acid monomer unit. Formula VII shows an illustrative embodiment of the present disclosure, where x and y are integers and R is a hydrogen or an alkyl, alkenyl, alkynyl, aryl, heteroaryl, or cycloalkyl group. For example, a multifunctional boronic acid polymer according to Formula VII may be prepared by copolymerizing 3-acrylamidophenylboronic acid with an acrylamide monomer unit (e.g., N,N-dimethylacrylamide) by free radical polymerization to provide the multifunctional boronic acid polymer, wherein the ratio of x:y is in the range of from a lower limit of about 1:1, 1:10, 1:20, 1:30, 1:40, 1:50, 1:60, 1:70, 1:80, 1:90, and 1:100 to an upper limit of about 1:200, 1:190, 1:180, 1:170, 1:160, 1:150, 1:140, 1:130, 1:120, 1:110, and 1:100, encompassing any value and subset therebetween.

Formula VII

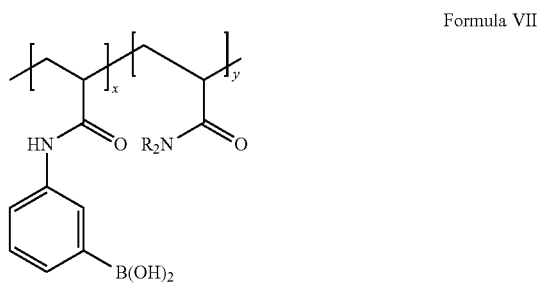

In another illustrative embodiment, a multifunctional boronic acid polymer may be prepared by copolymerizing 4-vinylphenylboronic acid and acrylamide. Such a copolymer has a structure represented by Formula VIII. In some embodiments, the 4-vinylphenylboronic acid may be protected as a boronate ester such as, for example, a polyol boronate ester. Such a copolymer has a structure represented by Formula IX. It should be understood that any vicinal hydroxyl groups in the polyol can react with the boronic acid, and the indicated structure in Formula IX should be considered illustrative in that regard. That is, other isomers may be formed. In both Formulas VIII and IX, x and y are integers. As previously noted, the solubilizing groups (e.g., the polyol) may be removed at some point after the synthesis of the copolymer to liberate the free boronic acid groups for crosslinking with the gelling agent in the treatment fluid.

Formula VIII

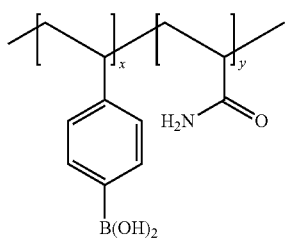

Formula IX

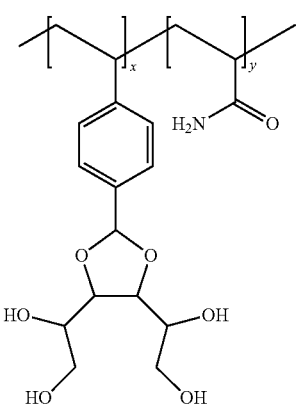

In yet another illustrative embodiment, the multifunctional boronic acid polymer may comprise a compound represented by Formula X, where x and y are integers and R is a hydrogen or an alkyl, alkenyl, alkynyl, aryl, heteroaryl, or cycloalkyl group.

Formula X

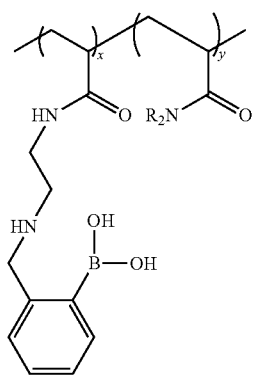

In one embodiment illustrated by Formula X, the multifunctional boronic acid polymer may be prepared by copolymerizing 2-((2-acrylamidoethylamino)methyl)phenylboronic acid and an acrylamide, wherein the ratio of x:y is in the range of from a lower limit of about 1:1, 1:10, 1:20, 1:30, 1:40, 1:50, 1:60, 1:70, 1:80, 1:90, and 1:100 to an upper limit of about 1:200, 1:190, 1:180, 1:170, 1:160, 1:150, 1:140, 1:130, 1:120, 1:110, and 1:100, encompassing any value and subset therebetween.

In still another illustrative embodiment, the multifunctional boronic acid polymer may be difunctional having Formula XI, where n is an integer and R comprises a carbon, nitrogen, oxygen or sulfur atom. For example, when R is O or NH, the difunctional boronic acid polymer of Formula XI may be prepared by reacting two equivalents of 2-formylphenylboronic acid with one equivalent of oligomeric ethylene oxide or oligomeric ethylenediamine followed by reduction of the intermediate imine.

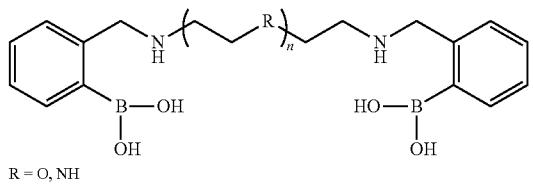

R = O, NH
n = 1-1000

In other embodiments, the crosslinkable proppant particulates described herein comprise proppant particulates having covalently grafted thereon a non-boronic acid functional group (e.g., through a condensation reaction with hydroxyl groups on the proppant particulates). Once the functional group is covalently grafted onto the proppant particulates, they may be introduced into a treatment fluid comprising an aqueous base fluid, a gelling agent, and a crosslinker. In the treatment fluid, the non-boronic acid functional groups forming the crosslinkable proppant particulates crosslink with the crosslinker, which in turn crosslinks with the gelling agent, thereby suspending the crosslinkable proppant particulates in the treatment fluid. While it may be possible that one or more of the non-boronic acid functional groups may crosslink directly with the gelling agent, it may be desirable to include the crosslinker as an intermediary between the gelling agent and the functional group on the proppant particulates to ensure enhanced or strengthened chemical bonding and thus suspension of the crosslinkable proppant particulates in the treatment fluid. The treatment fluid comprising the crosslinkable proppant particulates may thereafter be introduced into a subterranean formation having at least one fracture (whether formed using the treatment fluid itself or a pad fluid, as previously discussed) and the crosslinkable proppant particulates placed therein to form a proppant pack.

Any functional groups suitable for interacting with the crosslinkers and/or gelling agents, if so designed, of the present disclosure to self-suspend the crosslinkable proppant particulates may be covalently grafted thereon. Examples of suitable non-boronic acid functional groups for forming the crosslinkable proppant particulates of the present disclosure may include, but are not limited to, a hydroxyl group, cis-hydroxyl group, dihydroxyl group, a carboxylic acid group, a sulfate group, a sulfonate group, a phosphate group, a phosphonate group, an amino group, an amide group, a compound having at least one of the foregoing functional groups, and any combination thereof. Specific examples of suitable hydroxyl groups for forming the crosslinkable proppant particulates of the present disclosure may include, but are not limited to, a compound selected from the group consisting of methanol, propanol, isopropanol, n-butanol, ethanol, and any combination thereof. Suitable carboxylic acid groups may include, but are not limited to, a compound selected from the group consisting of methanoic acid, ethanoic acid, propanoic acid, 2-methylbutanoic acid, and any combination thereof. Sulfate groups suitable for forming the crosslinkable proppant particulates described herein may include, but are not limited to, a compound selected from the group consisting calcium hydrogen sulfate, copper(II) sulfate pentahydrate, barium hydrogen sulfate, magnesium sulfate heptahydrate, lead(II) hydrogen sulfate, zinc sulfate heptahydrate, lithium sulfate monohydrate, and any combination thereof.

Suitable sulfonate groups that may be used to form the crosslinkable proppant particulates of the present disclosure may include, but are not limited to, a compound selected from the group consisting of S-methyl methanethiosulfonate, 2,2,2-trifluoroethyl methane sulfonate, 2-chloroethyl methanesulfonate, ethyl methanesulfonate, trimethyl chlorosulfonate, 2,2,2-trifluoroethyl perfluorobutylsulfonate, phenyl methanesulfonate, phyenyl vinylsulfonate, 2-butynyl p-toluenesulfonate, 3-(4-methoxyphenoxy)-propyl methanesulfonate, S-phenol benzenethiosulfonate, phenyl-2-aminobenzenesulfonate, methyl dodecylbenzenesulfonate, and any combination thereof. Phosphate groups may also be covalently grafted onto proppant particulates to form the crosslinkable proppant particulates capable of crosslinking in a treatment fluid comprising a gelling agent and crosslinker. Suitable phosphate groups may include, but are not limited to, a compound selected from the group consisting of magnesium ammonium phosphate hexahydrate, ammonium phosphate, magnesium dihydrogen phosphate, ammonium hydrogen phosphate, sodium dihydrogen phosphate, monopotassium phosphate, potassium hydrogen phosphate, and any combination thereof.

Phosphonate groups may also be employed including, but not limited to, a compound selected from the group consisting of dimethyl thiophosphonate, ethyl methylphosphonate, dimethyl vinylphosphonate, diethyl (trichloromethyl)phosphonate, diethyl (difluoromethyl)phosphonate, diethyl vinylphosphonate, tetramethyl-1,2-phylenediphosphonate, diethyl benzoylphosphonate, diethyl 3-bromobenzylphosphonate, diethyl 3-chlorobenzylphosphonate, tetraisopropyl methylenediphosphonate, dioctyl phenylphosphonate, and any combination thereof. Suitable amino groups for forming the crosslinkable proppant particulates of the present disclosure may include, but are not limited to, a compound selected from the group consisting of a primary amine, a secondary amine, a tertiary amine, a cyclic amine, and any combination thereof. Yet another type of functional group that may be used to form the crosslinkable proppant particulates is an amide group which may include, but is not limited to, a compound selected from the group consisting of a primary amide, a secondary amide, a tertiary amide, a cyclic amide, and any combination thereof.

In some embodiments, the crosslinkable proppant particulates described herein may include a combination of boronic acid functional groups and non-boronic acid functional groups, allowing for a reduced amount of crosslinker to be included in the treatment fluid to self-suspend the crosslinkable proppant particulates therein. Generally, the functional groups (of any type) may be covalently grafted onto the proppant particulates in any amount ranging from a single functional group to saturation, wherein the proppant particulate is no longer able to accept a functional group for covalent bonding thereon. The amount and type of functional groups used to form the crosslinkable proppant particulates may depend on a number of factors including, but not limited to, the amount of desired self-suspension, the type of subterranean formation operation, the amount or type of gelling agent used, the amount or type of crosslinker used, the conditions of the subterranean formation (e.g., temperature, pH, etc.), and the like.

The proppant particulates for forming the crosslinkable proppant particulates described herein may be composed of any material capable of covalently bonding with one or more of the functional groups described herein. In some embodiments, the proppant particulates may be a natural or man-made material such as, for example, natural sand, silica, sodium silicate, meta-silicate, calcium silicate, aluminum silicate, ceramic, sintered bauxite, and any combination thereof. The proppant particulates may additionally be of any size and shape combination suitable for the particular subterranean formation operation in which they are being used (e.g., a fracturing operation). Generally, where the chosen proppant particulate is substantially spherical, suitable proppant particulates may have a size in the range of from a lower limit of about 2 mesh, 10 mesh, 20 mesh, 30 mesh, 40 mesh, 50 mesh, 60 mesh, 70 mesh, 80 mesh, 90 mesh, 100 mesh, 110 mesh, 120 mesh, 130 mesh, 140 mesh, 150 mesh, 160 mesh, 170 mesh, 180 mesh, 190 mesh, and 200 mesh to an upper limit of about 400 mesh, 390 mesh, 380 mesh, 370 mesh, 360 mesh, 350 mesh, 340 mesh, 330 mesh, 320 mesh, 310 mesh, 300 mesh, 290 mesh, 280 mesh, 270 mesh, 260 mesh, 250 mesh, 240 mesh, 230 mesh, 220 mesh, 210 mesh, and 200 mesh, U.S. Sieve Series, or even higher, encompassing any value and subset therebetween. In some embodiments of the present disclosure, the proppant particulates may have a size in the range of from about 8 to about 120 mesh, U.S. Sieve Series.

In some embodiments of the present disclosure, it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, cylinder-shaped, and any combination thereof. That is, in embodiments wherein the particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches ("in"), 0.03 in, 0.04 in, 0.05 in, 0.06 in, 0.07 in, 0.08 in, 0.09 in, 0.1 in, 0.11 in, 0.12 in, 0.13 in, 0.14 in, and 0.15 in to an upper limit of about 0.3 in, 0.29 in, 0.28 in, 0.27 in, 0.26 in, 0.25 in, 0.24 in, 0.23 in, 0.22 in, 0.21 in, 0.2 in, 0.19 in, 0.18 in, 1.17 in, 0.16 in, and 0.15 in length, encompassing any value and subset therebetween. In other embodiments, the longest axis is from about 0.05 inches to about 0.2 inches in length. In one embodiment, the substantially non-spherical proppant particulates may be cylindrical and have an aspect ratio of about 1.5 to about 1, and about 0.08 inches in diameter and about 0.12 inches in length. In another embodiment, the substantially non-spherical proppant particulates may be cubic having sides of about 0.08 inches in length. The use of substantially non-spherical proppant particulates may be desirable in some embodiments because, among other things, they may provide a lower rate of settling when slurried into a treatment fluid, or may be better suited for placement in the preexisting and/or new fractures in a subterranean formation to form a proppant pack.

The treatment fluids disclosed herein may comprise an aqueous base fluid, a gelling agent, and in some instances as described above, a crosslinker. The aqueous base fluid may include, but is not limited to, fresh water, saltwater (e.g., water containing one or more salts dissolved therein), brine (e.g., saturated salt water), seawater, and any combination thereof. Generally, the water may be from any source, provided that it does not contain components that might adversely affect the stability and/or performance of the crosslinkable proppant particulates or any other component of the treatment fluid.

A variety of gelling agents may be used in the treatment fluids of the present disclosure. Suitable gelling agents typically comprise biopolymers, synthetic polymers, or both. In some embodiments, suitable gelling agents may be biopolymers comprising polysaccharides, and derivatives thereof, including those that have one or more of the following monosaccharide units: galactose, mannose, glucoside, glucose, xylose, arabinose, fructose, glucuronic acid, or pyranosyl sulfate. Examples of suitable biopolymers can include, but are not limited to, guar, guar gum and derivatives thereof (e.g., hydroxypropyl guar and carboxymethylhydroxypropyl guar), cellulose and cellulose derivatives (e.g., carboxymethyl cellulose, carboxymethyl cellulose, and hydroxyethyl cellulose), and xanthan and derivatives thereof.

In some embodiments, the gelling agent, particularly a biopolymer, may be at least partially depolymerized. The term "depolymerized," as used herein, generally refers to a decrease in the molecular weight of the gelling agent molecule by removal of at least some of its monomer units.

In some embodiments, the gelling agent may comprise a synthetic polymer. In some embodiments, the gelling agent may be a synthetic polymer containing hydroxyl groups such as, for example, polyvinyl alcohol. In some embodiments, suitable monomers useful in forming a synthetic polymer useful as a gelling agent can include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid, alkyl acrylates, alkyl methacrylates, alkyl acrylamides, alkyl methacrylamides alkyl dimethylammoniumethyl methacrylate halides, alkyl dimethylammoniumpropyl methacrylamide halides, and any combination thereof. In some embodiments, these monomers and others may be copolymerized with monomers that contain hydroxyl groups suitable for crosslinking with a multifunctional boronic acid functional group covalently grafted onto a proppant particulate or a crosslinker, as described below. Illustrative synthetic polymers that can include the foregoing water-soluble monomers include, but are not limited to, polyacrylates, polymethacrylates, polyacrylamides, polyvinyl alcohol, polyvinylpyrrolidone, and their copolymers.

Additional suitable synthetic polymers for use as the gelling agents in the treatment fluids described herein may include, but are not limited to, 2,2'-azobis(2,4-dimethyl valeronitrile), 2,2'-azobis(2,4-dimethyl-4-methoxy valeronitrile), acrylamide ethyltrimethyl ammonium chloride, acrylamide, an acrylamido-alkyl trialkyl ammonium salt, a methacrylamido-alkyl trialkyl ammonium salt, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, a methacryloylalkyl trialkyl ammonium salt, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly-2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, copolymers thereof, 2-(methacryloyloxy)ethyltrimethylammonium methyl sulfate, 2-(methacryloyloxy)ethyltrimethylammonium chloride, and any combination thereof.

In certain embodiments, the gelling agent may be present in a treatment fluid in an amount ranging from a lower limit of about 0.05%, 0.075%, 0.1%, 0.25%, 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by weight of the aqueous fluid therein, encompassing any value and subset therebetween. In certain embodiments, the crosslinkable proppant particulates permit a lesser amount of gelling agent to be used in a treatment fluid without compromising desired suspension properties, such as, for example ranging from a lower limit of about 0.05% to about 5% by weight of the aqueous fluid therein, encompassing any value and subset therebetween.

A crosslinker may be included in the treatment fluids described herein, particularly when the functional group covalently grafted on the proppant particulates is not selected to crosslink directly with the gelling agent selected. The crosslinker may act as an intermediary, crosslinking the gelling agent to the functional group on the crosslinkable proppant particulates to facilitate self-suspension. The order of the crosslinker crosslinking either of the gelling agent or the functional group on the crosslinkable proppant particulates is not important to the function of the crosslinkable proppant particulates and any order or simultaneous crosslinking may occur without departing from the scope of the present disclosure.

Examples of suitable crosslinkers include, but are not limited to, borate ions, magnesium ions, zirconium IV ions, titanium IV ions, aluminum ions, antimony ions, chromium ions, iron ions, copper ions, magnesium ions, and zinc ions. These ions may be provided by providing any compound that is capable of producing one or more of these ions. Examples of such compounds include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof.

In certain embodiments of the present disclosure, the crosslinker may be formulated to remain inactive until it is "activated" by, among other things, certain conditions in the fluid (e.g., pH, temperature, etc.) and/or interaction with some other substance. Such delayed activation may be desirable, for example, when the treatment fluid is to be stored prior to its use in a subterranean formation operation, such as a fracturing operation. In some embodiments, the activation of the crosslinker may be delayed by encapsulation with a coating (e.g., a porous coating through which the crosslinker may diffuse slowly, or a degradable coating that degrades downhole) that delays the release of the crosslinker until a desired time or place. The choice of a particular crosslinker will be governed by several considerations, including but not limited to the type of gelling agent included, the type of functional groups forming the crosslinkable proppant particulates, the molecular weight of the gelling agent(s), the conditions in the subterranean formation being treated, the conditions of the formation (e.g., temperature, pH, etc.), the desired delay, and the like.

When included, suitable crosslinkers may be present in the treatment fluids in an amount sufficient to provide the desired degree of crosslinking to self-suspend the crosslinkable proppant particulates. In certain embodiments, the crosslinker may be present in the treatment fluids in an amount in the range of from a lower limit of about 0.005%, 0.0075%, 0.01%, 0.025%, 0.05%, 0.075%, 0.1%, 0.125%, 0.15%, 0.175%, 0.2%, 0.225%, 0.25%, 0.275%, 0.3%, 0.325%, 0.35%, 0.375%, 0.4%, 0.425%, 0.45%, 0.475%, and 0.5% to an upper limit of about 1%, 0.975%, 0.95%, 0.925%, 0.9%, 0.875%, 0.85%, 0.825%, 0.8%, 0.75%, 0.75%, 0.725%, 0.7%, 0.675%, 0.65%, 0.625%, 0.6%, 0.575%, 0.55%, 0.525%, and 0.5% by weight of the treatment fluid.

In some embodiments, the treatment fluids described herein may further comprise a breaker capable of "delinking" the crosslinks between the gelling agent and/or the functional group on the crosslinkable proppant particulates and the crosslinker or between the functional groups on the crosslinkable proppant particulates and the crosslinker.

In some applications, after a viscosified treatment fluid has performed its desired function, its viscosity may be reduced. For example, in a subterranean application, once the viscosified treatment fluid's viscosity has been reduced, it may be flowed back to the surface, and the well may be returned to production. As used herein, the terms "delink" or "delinking" refer to the reversible removal of crosslinks between at least two molecules that are crosslinked.

The breakers may be any material that does not adversely interact or react with crosslinkable proppant particulates or the additives in the treatment fluid to provide self-suspension to the crosslinkable proppant particulates. In some embodiments, the breaker may include, but is not limited to, enzymes, oxidizers, chelators, acids or their salts, and combinations thereof. Suitable examples of enzyme breakers may include, but are not limited to, alpha and beta amylases, amyloglucosidases, invertases, maltases, cellulases, hemicellulases, and the like, and any combination thereof. Suitable examples of oxidizer breakers may include, but are not limited to, persulfates (e.g., sodium, potassium, ammonium, etc.), perborates, bromates, periodates, chlorates, chlorites, hypochlorites, organic peroxides, and the like, and any combination thereof. Suitable examples of acid breakers may include, but are not limited to, citric acid, fumaric acid, tannic acid, and the like, and any combination thereof. Suitable examples of chelator breakers may include, but are not limited to, ethylenediaminetetraacetic acid (EDTA), nitrilotriacetic acid (NTA), any derivatives of these, and the like, and any combination thereof. In some embodiments, the breaker is present in an amount ranging from a lower limit of about 0.001% to an upper limit of about 0.001%, 0.0025%, 0.005%, 0.0075%, 0.01%, 0.025%, 0.05%, 0.075%, 0.1%, 0.125%, 0.15%, 0.175%, 0.2%, 0.225%, 0.25%, 0.275%, 0.3%, 0.325%, 0.35%, 0.375%, 0.4%, 0.425%, 0.45%, 0.475%, and 0.5% to an upper limit of about 1%, 0.975%, 0.95%, 0.925%, 0.9%, 0.875%, 0.85%, 0.825%, 0.8%, 0.75%, 0.75%, 0.725%, 0.7%, 0.675%, 0.65%, 0.625%, 0.6%, 0.575%, 0.55%, 0.525%, and 0.5% by weight of the treatment fluid.

In some embodiments, the pH of the treatment fluid may be adjusted to achieve delinking of the crosslinks between one or more of the functional groups on the crosslinkable proppant particulates, the gelling agent, and the crosslinker. The pH may be adjusted by including in the treatment fluids described herein pH-adjusting agents. In certain embodiments in which the pH is to be increased (e.g., to facilitate crosslinking), suitable pH-adjusting agents may comprise a base. Examples of suitable pH-adjusting agent bases may include, but are not limited to, sodium hydroxide, potassium hydroxide, lithium hydroxide, sodium carbonate, potassium carbonate, sodium bicarbonate, potassium bicarbonate, sodium diacetate, potassium diacetate, sodium phosphate, potassium phosphate, sodium hydrogen phosphate, potassium hydrogen phosphate, sodium dihydrogen phosphate, potassium dihydrogen phosphate, ammonium hydroxide, and any combination thereof. In other embodiments in which the pH is to be decreased (e.g., to facilitate delinking), suitable pH-adjusting agent acids may be used including, but are not limited to, fumaric acid, formic acid, acetic acid, sulfamic acid, sodium acetate, acetic anhydride, hydrochloric acid, sulfuric acid, hydrofluoric acid, hydroxyfluoroboric acid, polyaspartic acid, polysuccinimide, and any combination thereof. The amount of pH-adjusting agent to include in a particular treatment fluid will depend on the desired pH to induce delinking of crosslinks and will vary depending on a number of factors including, but not limited to, the type of functional groups on the crosslinkable proppant particulates, the type of gelling agent, the type of crosslinkers if present, the conditions of the subterranean formation (e.g., temperature, pH, etc.), and the like. In some embodiments, a pH-adjusting agent and a breaker may be used simultaneously in a treatment fluid, without departing from the scope of the present disclosure.

In some embodiments, the treatment fluids comprising the crosslinkable proppant particulates described herein may further comprise an additive selected from the group consisting of a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a bactericide, a crosslinker, a stabilizer, a chelating agent, a scale inhibitor, a gas hydrate inhibitor, an oxidizer, a reducer, a friction reducer, a clay stabilizing agent, and any combination thereof.

In various embodiments, systems configured for delivering the treatment fluids comprising the crosslinkable proppant particulates described herein to a downhole location are described. In various embodiments, the systems may comprise a pump fluidly coupled to a tubular, the tubular containing the treatment fluids described herein. It will be appreciated that while the system described below may be used for delivering treatment fluids described herein, one or more portions of the treatment fluid may be delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the non-degradable particulates, the degradable particulates, and the proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A: A method comprising: preparing a treatment fluid comprising an aqueous base fluid, a gelling agent, and crosslinkable proppant particulates comprising proppant particulates having covalently grafted thereon a boronic acid functional group; crosslinking the crosslinkable proppant particulates with the gelling agent, thereby suspending the crosslinkable proppant particulates in the treatment fluid; introducing the treatment fluid into a subterranean formation having at least one fracture therein; and placing the crosslinkable proppant particulates into the at least one fracture to form a proppant pack therein.

Embodiment A may have one or more of the following additional elements in any combination:

Element A1: Wherein the boronic acid functional group is from a compound selected from the group consisting an alkyl boronic acid, an alkenyl boronic acid, an aryl boronic acid, a heteroaryl boronic acid, and any combination thereof.

Element A2: Wherein the boronic acid functional group is a multifunctional polymer comprising at least one boronic acid monomer unit and at least one water-soluble monomer unit.

Element A3: Wherein the boronic acid functional group is a multifunctional polymer comprising at least one boronic acid monomer unit and at least one water-soluble monomer unit, wherein the at least one boronic acid monomer unit is selected from the group consisting of an aryl boronic acid, an alkyl boronic acid, an alkenyl boronic acid, an alkynyl boronic acid, and any combination thereof.

Element A4: Wherein the boronic acid functional group is a multifunctional polymer comprising at least one boronic acid monomer unit and at least one water-soluble monomer unit, wherein the at least one water-soluble monomer unit is selected from the group consisting of an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof.

Element A5: Wherein the boronic acid functional group is a multifunctional polymer comprising the reaction product of at least one boronic acid monomer unit, at least one water-soluble monomer unit, and a solubilizing agent selected from the group consisting of a short chain polyol, a polysaccharide, an amino sugar, a sugar alcohol, a sugar acid, polyvinyl alcohol, tartaric acid, a catechol, a glycol, any derivative thereof, and any combination thereof.

Element A6: Wherein the treatment fluid further comprises a solubilizing agent comprising at least two hydroxyl groups.

Element A7: Wherein the treatment fluid further comprises a breaker selected from the group consisting of an enzyme, an oxidizer, a chelator, an acid, and any combination thereof.

Element A8: Further comprising a wellhead with a tubular extending therefrom and into the subterranean formation and a pump fluidly coupled to the tubular, wherein the step of: introducing the treatment fluid into the subterranean formation comprises introducing the treatment fluid through the tubular.

By way of non-limiting example, exemplary combinations applicable to A include: A with A1 and A7; A with A2, A3, and A8; A with A3, A5, and A6; A with A2 and A5; A with A4 and A7.

Embodiment B: A method comprising: preparing a treatment fluid comprising an aqueous base fluid, a gelling agent, a crosslinker, and crosslinkable proppant particulates comprising proppant particulates having covalently grafted thereon at least one functional group selected from the group consisting of a hydroxyl group, cis-hydroxyl group, dihydroxyl group, a carboxylic acid group, a sulfate group, a sulfonate group, a phosphate group, a phosphonate group, an amino group, an amide group, a compound having at least one of the foregoing functional groups, and any combination thereof; crosslinking the crosslinkable proppant particulates with the crosslinker and crosslinking the crosslinker with the gelling agent, thereby suspending the crosslinkable proppant particulates in the treatment fluid; introducing the treatment fluid into a subterranean formation having at least one fracture therein; and placing the crosslinkable proppant particulates into the at least one fracture to form a proppant pack therein.

Embodiment B may have one or more of the following additional elements in any combination:

Element B1: Wherein the hydroxyl group is from a compound selected from the group consisting of methanol, propanol, isopropanol, n-butanol, ethanol, and any combination thereof.

Element B2: Wherein the carboxylic acid group is from a compound selected from the group consisting of methanoic acid, ethanoic acid, propanoic acid, 2-methylbutanoic acid, and any combination thereof.

Element B3: Wherein the sulfate group is from a compound selected from the group consisting calcium hydrogen sulfate, copper(II) sulfate pentahydrate, barium hydrogen sulfate, magnesium sulfate heptahydrate, lead(II) hydrogen sulfate, zinc sulfate heptahydrate, lithium sulfate monohydrate, and any combination thereof.

Element B4: Wherein the sulfonate group is from a compound selected from the group consisting of S-methyl methanethiosulfonate, 2,2,2-trifluoroethyl methane sulfonate, 2-chloroethyl methanesulfonate, ethyl methanesulfonate, trimethyl chlorosulfonate, 2,2,2-trifluoroethyl perfluorobutylsulfonate, phenyl methanesulfonate, phyenyl vinylsulfonate, 2-butynyl p-toluenesulfonate, 3-(4-methoxyphenoxy)-propyl methanesulfonate, S-phenol benzenethiosulfonate, phenyl-2-aminobenzenesulfonate, methyl dodecylbenzenesulfonate, and any combination thereof.

Element B5: Wherein the phosphate group is from a compound selected from the group consisting of magnesium ammonium phosphate hexahydrate, ammonium phosphate, magnesium dihydrogen phosphate, ammonium hydrogen phosphate, sodium dihydrogen phosphate, monopotassium phosphate, potassium hydrogen phosphate, and any combination thereof.

Element B6: Wherein the amino group is from a compound selected from the group consisting of a primary amine, a secondary amine, a tertiary amine, a cyclic amine, and any combination thereof.

Element B7: Wherein the amide group is from a compound selected from the group consisting of a primary amide, a secondary amide, a tertiary amide, a cyclic amide, and any combination thereof.

Element B8: Wherein the crosslinker is selected from the group consisting of a borate ion, a magnesium ion, a zirconium IV ion, a titanium IV ion, an aluminum ion, an antimony ion, a chromium ion, an iron ion, a copper ion, a magnesium ion, a zinc ion, a compound capable of producing at least one of the foregoing functional groups.

Element B9: further comprising a wellhead with a tubular extending therefrom and into the subterranean formation and a pump fluidly coupled to the tubular, wherein the step of: introducing the treatment fluid into the subterranean formation comprises introducing the treatment fluid through the tubular.

By way of non-limiting example, exemplary combinations applicable to B include: B with B1 and B7; B with B2, B5, and B9; B with B6 and B8; B with B2, B3, and B4; B with B5 and B9.

Embodiment C: A treatment fluid comprising: an aqueous base fluid; a gelling agent; and crosslinkable proppant particulates comprising proppant particulates having covalently grafted thereon a boronic acid functional group, wherein the crosslinkable proppant particulates are crosslinked with the gelling agent, thereby suspending the crosslinkable proppant particulates in the treatment fluid.

Embodiment C may have one or more of the following additional elements in any combination:

Element C1: Wherein the boronic acid functional group is from a compound selected from the group consisting an alkyl boronic acid, an alkenyl boronic acid, an aryl boronic acid, a heteroaryl boronic acid, and any combination thereof.

Element C2: Wherein the boronic acid functional group is a multifunctional polymer comprising at least one boronic acid monomer unit and at least one water-soluble monomer unit.

Element C3: Wherein the boronic acid functional group is a multifunctional polymer comprising at least one boronic acid monomer unit and at least one water-soluble monomer unit, wherein the at least one boronic acid monomer unit is selected from the group consisting of an aryl boronic acid, an alkyl boronic acid, an alkenyl boronic acid, an alkynyl boronic acid, and any combination thereof.

Element C4: Wherein the boronic acid functional group is a multifunctional polymer comprising at least one boronic acid monomer unit and at least one water-soluble monomer unit, wherein the at least one water-soluble monomer unit is selected from the group consisting of an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof.

Element C5: Wherein the boronic acid functional group is a multifunctional polymer comprising the reaction product of at least one boronic acid monomer unit, at least one water-soluble monomer unit, and a solubilizing agent selected from the group consisting of a short chain polyol, a polysaccharide, an amino sugar, a sugar alcohol, a sugar acid, polyvinyl alcohol, tartaric acid, a catechol, a glycol, any derivative thereof, and any combination thereof.

Element C6: Wherein the treatment fluid further comprises a solubilizing agent comprising at least two hydroxyl groups.

Element C7: Wherein the treatment fluid further comprises a breaker selected from the group consisting of an enzyme, an oxidizer, a chelator, an acid, and any combination thereof.

Element C8: Further comprising a wellhead with a tubular extending therefrom and into the subterranean formation and a pump fluidly coupled to the tubular, wherein the step of: introducing the treatment fluid into the subterranean formation comprises introducing the treatment fluid through the tubular.

By way of non-limiting example, exemplary combinations applicable to C include: C with C1 and C3; C with C1, C2, and C4; C with C6 and C7; C with C3, C5, and C8.

To facilitate a better understanding of the embodiments of the present disclosure, the following examples of preferred or representative embodiments are given. In no way should the following examples be read to limit, or to define, the scope of the disclosure.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   forming crosslinkable proppant particulates by covalently grafting a boronic acid functional group to proppant particulates;
   preparing a treatment fluid by combining an aqueous base fluid, a gelling agent, and the formed crosslinkable proppant particulates;
   crosslinking the crosslinkable proppant particulates with the gelling agent, thereby suspending crosslinked proppant particulates in the treatment fluid; and
   introducing the treatment fluid with the suspended crosslinked proppant particulates into a subterranean formation having at least one fracture therein,
   thereby placing the suspended crosslinked proppant particulates into the at least one fracture to form a proppant pack therein.

2. The method of claim 1, wherein the boronic acid functional group is from a compound selected from the group consisting of an alkyl boronic acid, an alkenyl boronic acid, an aryl boronic acid, a heteroaryl boronic acid, and any combination thereof.

3. The method of claim 1, wherein the boronic acid functional group is a multifunctional polymer comprising at least one boronic acid monomer unit and at least one water-soluble monomer unit.

4. The method of claim 3, wherein the at least one boronic acid monomer unit is selected from the group consisting of an aryl boronic acid, an alkyl boronic acid, an alkenyl boronic acid, an alkynyl boronic acid, and any combination thereof.

5. The method of claim 3 wherein the at least one water-soluble monomer unit is selected from the group consisting of an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof.

6. The method of claim 1, wherein the boronic acid functional group is a multifunctional polymer comprising the reaction product of at least one boronic acid monomer unit, at least one water-soluble monomer unit, and a solubilizing agent selected from the group consisting of a short chain polyol, a polysaccharide, an amino sugar, a sugar alcohol, a sugar acid, polyvinyl alcohol, tartaric acid, a catechol, a glycol, any derivative thereof, and any combination thereof.

7. The method of claim 1, wherein the treatment fluid further comprises a solubilizing agent comprising at least two hydroxyl groups.

8. The method of claim 1, wherein the treatment fluid further comprises a breaker selected from the group consisting of an enzyme, an oxidizer, a chelator, an acid, and any combination thereof.

9. The method of claim 1,
wherein introducing the treatment fluid into the subterranean formation comprises introducing the treatment fluid through a tubular extending from a wellhead and into the subterranean formation, with a pump fluidly coupled to the tubular.

10. A method comprising:
forming crosslinkable proppant particulates by covalently grafting at least one functional group to proppant particulates;
preparing a treatment fluid by combining an aqueous base fluid, a gelling agent, a crosslinker, and the formed crosslinkable proppant particulates wherein the at least one functional group is selected from the group consisting of a hydroxyl group, cis-hydroxyl group, dihydroxyl group, a carboxylic acid group, a sulfate group, a sulfonate group, a phosphate group, a phosphonate group, an amino group, an amide group, a compound having at least one of the foregoing functional groups, and any combination thereof;
crosslinking the crosslinkable proppant particulates with the crosslinker and crosslinking the crosslinker with the gelling agent, thereby suspending crosslinked proppant particulates in the treatment fluid; and
introducing the treatment fluid with the suspended crosslinked proppant particulates into a subterranean formation having at least one fracture therein,
thereby placing the suspended crosslinked proppant particulates into the at least one fracture to form a proppant pack therein.

11. The method of claim 10, wherein the at least one functional group is the hydroxyl group, and wherein the hydroxyl group is from a compound selected from the group consisting of methanol, propanol, isopropanol, n-butanol, ethanol, and any combination thereof.

12. The method of claim 10, wherein the at least one functional group is the carboxylic acid group, and wherein the carboxylic acid group is from a compound selected from the group consisting of methanoic acid, ethanoic acid, propanoic acid, 2-methylbutanoic acid, and any combination thereof.

13. The method of claim 10, wherein the at least one functional group is the sulfate group, and wherein the sulfate group is from a compound selected from the group consisting of calcium hydrogen sulfate, copper(II) sulfate pentahydrate, barium hydrogen sulfate, magnesium sulfate heptahydrate, lead(II) hydrogen sulfate, zinc sulfate heptahydrate, lithium sulfate monohydrate, and any combination thereof.

14. The method of claim 10, wherein the at least one functional group is the sulfonate group, and wherein the sulfonate group is from a compound selected from the group consisting of S-methyl methanethiosulfonate, 2,2,2-trifluoroethyl methane sulfonate, 2-chloroethyl methanesulfonate, ethyl methanesulfonate, trimethyl chlorosulfonate, 2,2,2-trifluoroethyl perfluorobutylsulfonate, phenyl methanesulfonate, phyenyl vinylsulfonate, 2-butynyl p-toluenesulfonate, 3-(4-methoxyphenoxy)-propyl methanesulfonate, S-phenol benzenethiosulfonate, phenyl-2-aminobenzenesulfonate, methyl dodecylbenzenesulfonate, and any combination thereof.

15. The method of claim 10, wherein the at least one functional group is the phosphate group, and wherein the phosphate group is from a compound selected from the group consisting of magnesium ammonium phosphate hexahydrate, ammonium phosphate, magnesium dihydrogen phosphate, ammonium hydrogen phosphate, sodium dihydrogen phosphate, monopotassium phosphate, potassium hydrogen phosphate, and any combination thereof.

16. The method of claim 10, wherein the at least one functional group is the phosphonate group, and wherein the phosphonate group is from a compound selected from the group consisting of dimethyl thiophosphonate, ethyl methylphosphonate, dimethyl vinylphosphonate, diethyl (trichloromethyl)phosphonate, diethyl (difluoromethyl)phosphonate, diethyl vinylphosphonate, tetramethyl-1,2-phylenediphosphonate, diethyl benzoylphosphonate, diethyl 3-bromobenzylphosphonate, diethyl 3-chlorobenzylphosphonate, tetraisopropyl methylenediphosphonate, dioctyl phenylphosphonate, and any combination thereof.

17. The method of claim 10, wherein the at least one functional group is the amino group, and wherein the amino group is from a compound selected from the group consisting of a primary amine, a secondary amine, a tertiary amine, a cyclic amine, and any combination thereof.

18. The method of claim 10, wherein the at least one functional group is the amide group, and wherein the amide group is from a compound selected from the group consisting of a primary amide, a secondary amide, a tertiary amide, a cyclic amide, and any combination thereof.

19. The method of claim 10, wherein the crosslinker is selected from the group consisting of a borate ion, a magnesium ion, a zirconium IV ion, a titanium IV ion, an aluminum ion, an antimony ion, a chromium ion, an iron ion, a copper ion, a magnesium ion, a zinc ion, a compound capable of producing at least one of the foregoing functional groups.

20. The method of claim 10,
wherein introducing the treatment fluid into the subterranean formation comprises introducing the treatment fluid through a tubular extending from a wellhead and into the subterranean formation, with a pump fluidly coupled to the tubular.

* * * * *